United States Patent

[11] 3,594,013

| | | |
|---|---|---|
| [72] | Inventor | Johannes Lauffer<br>Roter Berg, Germany |
| [21] | Appl. No. | 745,031 |
| [22] | Filed | July 15, 1968 |
| [45] | Patented | July 20, 1971 |
| [73] | Assignee | Hudson Automatic Machine & Tool Co.<br>Union City, N.J. |

[54] FLUID-ACTUATED CHUCKING AND INDEXING HEAD
22 Claims, 11 Drawing Figs.

[52] U.S. Cl. .................................................... 279/4,
74/817, 279/5
[51] Int. Cl. .................................................... B23b 31/30
[50] Field of Search ......................................... 279/4, 5;
74/816, 817, 823

[56] References Cited
UNITED STATES PATENTS

| | | | |
|---|---|---|---|
| 2,704,671 | 3/1955 | Abramoska | 279/4 |
| 3,087,736 | 4/1963 | Lukas | 279/5 X |
| 3,131,456 | 5/1964 | Bryant | 29/38 |
| 3,273,907 | 9/1966 | Voderberg | 279/5 |
| 2,848,909 | 8/1958 | Hill | 74/817 X |

FOREIGN PATENTS 517,578   0/1955   Canada .................. 279/5

Primary Examiner—Andrew R. Juhasz
Assistant Examiner—Donald D. Evenson
Attorney—Philip G. Hilbert ABSTRACT: This disclosure is directed to a fluid-actuated chucking and indexing head comprising a housing in which there is disposed a rotatable spindle adapted to reciprocally receive a collet sleeve. A fluid-actuated pressure plate is arranged to exert a force on the collet sleeve to effect displacement thereof to clamp and unclamp a collet onto a workpiece. Operatively connected to the spindle is an indexing assembly to effect the indexing of the clamped workpiece predetermined angular mounts. Actuation of both the chucking features and indexing features of workpiece is attained by a fluid pressure. A valve means is provided for directing a fluid pressure on a pressure plate to control the opening and closing of the collet and/or for ejection of the workpiece from the collet and the cleaning of the head of any dirt, cutting or other particles resulting from a machining operation on the workpiece, and a second valve means is provided for controlling the fluid pressure directed to the indexing means.

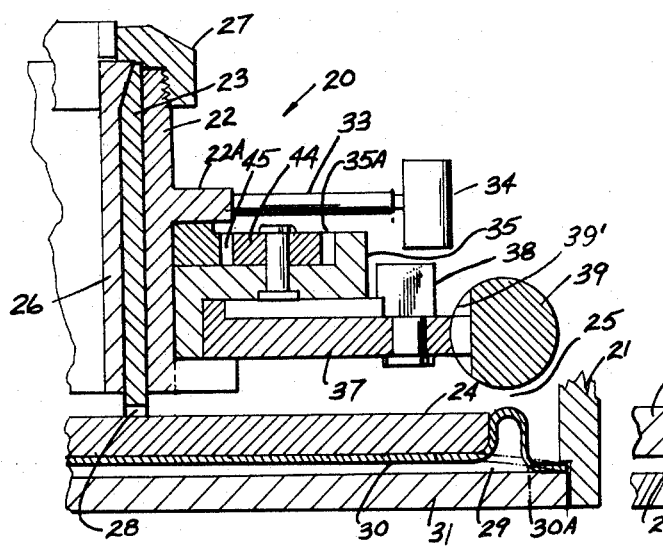
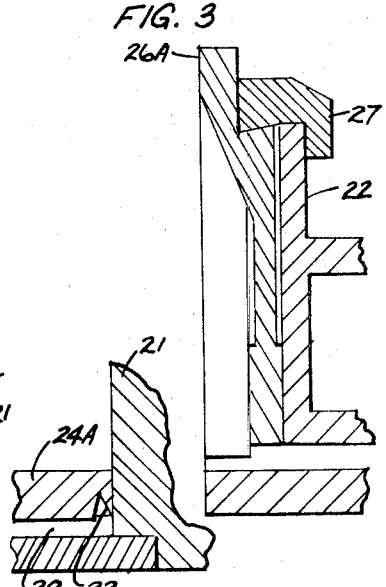
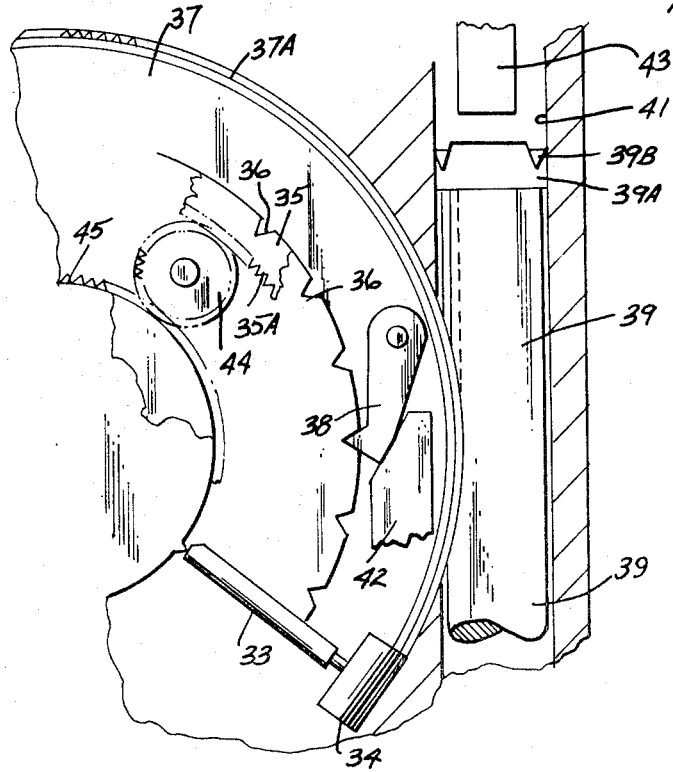

INVENTOR
Johannes Lauffer
BY Philip S. Hilber
ATTORNEY

PATENTED JUL 20 1971

INVENTOR
Johannes Lauffer

BY Philip S. Hilbert
ATTORNEY

३,५९४,०१३

FLUID-ACTUATED CHUCKING AND INDEXING HEAD

PROBLEMS AND PRIOR ART

Heretofore chucking devices having pneumatically or hydraulically operated collets for securing the workpiece therein have been known. However, in such known chucking devices the indexing of the workpiece about a vertical axis was required to be manually performed. For this reason, indexing of a workpiece in such chucking heads presented considerable difficulty since manual indexing resulted in a considerable loss of time and increased labor costs. In addition, manual indexing was constantly subjected to varying degrees in inaccuracies depending upon the skill and efficiency of the operator making the manual adjustments. Thus indexing of a workpiece with known pneumatically operated chucking heads was seldom achieved with a desired degree of accuracy.

Rotary indexing tables have also been known that were pneumatically actuated for effecting indexing of a workpiece. However, such indexing tables have been used independently of any chucking heads. Consequently, such rotating indexing tables lack the chucking facility for appropriately holding a workpiece thereon. Heretofore the chucking facilities had to be manually fitted to a particular indexing table. Also, such rotating indexing tables were generally actuated by a single or double acting conventional piston and cylinder assembly wherein the longitudinal movement of the piston was transmitted or converted to a rotary movement through a relatively complex system of latches and/or linkages. As a result, the indexing tables were restricted or limited to a predetermined or given number of indexing positions per table revolution, and that with such known tables fixed number of indexing positions could only be altered at a considerable effort, cost and labor. In all known indexing tables control was obtained either manually, or by mechanically actuated valves in which the pressure losses were unavoidable.

OBJECTS

It is an object of this invention to provide an improved chucking head with means for indexing of a workpiece adapted to be secured therein; and which is constructed to overcome the disadvantages noted in the prior art constructions.

Another object of this invention is to provide a chucking means and indexing means incorporated in a single unit that permits clamping of the workpiece so that machine operations such as milling, grilling and other forming operations may be performed on a workpiece and which permits the workpiece to be indexed to any predetermined rotatable position to subject the secured workpieces to additional machining operations such as cross-sliding, cross-drilling and/or flat milling.

Another object is to provide a chucking and indexing means wherein said workpiece can be automatically released from the chucking head and ejected therefrom and the clamping means being simultaneously cleansed of any chips or impurities resulting from the machining operations.

Another object is to provide a chucking head which can be readily indexed to the original position in preparation for receiving a subsequent workpiece.

Another object of this invention is to provide a combination chucking and indexing device wherein the respective operations can be performed in a predetermined sequence and in which the predetermined angular degrees of indexing can be readily determined by relatively simple adjustments.

It is a further object of this invention to provide a combination chucking and indexing means actuated by a pressurized fluid which may be controlled by an adjustable hand means to render the chucking and indexing device operative in clamping and unclamping positions and for indexing a workpiece in clamping position.

Another object of this invention is to provide a combination chucking and indexing head wherein the desired sequence of operations may be performed automatically with repetitive accuracies.

BRIEF SUMMARY OF THE INVENTION

The combination chucking and indexing head comprises essentially of a spindle rotatably journaled within a housing and a chucking means for securing a workpiece is reciprocally mounted within the spindle for a limited movement between an operative clamping position and an inoperative unclamping position. An actuating means is operatively associated with the chucking means for effecting the reciprocation thereof between an operative and inoperative position. An indexing means is operatively connected to the spindle to effect the indexing of the spindle predetermined angular amounts about its axis of rotation.

The chucking means includes a collet sleeve for receiving a collet disposed within the spindle, and a nose cap is threaded to the spindle for confining the collet within the collet sleeve.

In one form of the invention a valve means may be disposed adjacent the bottom of the collet sleeve for directing a fluid pressure thereto assist in the ejection of the workpiece and/or cleansing of the clamping and indexing device of the dirt, cuttings and the like resulting from a forming operation. The actuating means for effecting displacement of the sleeve comprises a chamber formed in the housing in which a pressure plate is movably mounted. The pressure plate is actuated between operative and inoperative position by a valve means controlling the flow of fluid pressure to the chamber on one side of the pressure plate which functions to displace the pressure plate toward and away from the chucking means to effect the clamping and unclamping of the workpiece.

The indexing means comprises an indexing plate which is suitably connected to the rotatable spindle and an indexing gear plate mounted for relative rotation with respect to the spindle. The indexing gear plate is operatively connected to a piston actuated driving rack, and a coupling means is operatively interconnected between the indexing plate and the indexing gear plate to effect the driving relationship therebetween whenever the gear plate is actuated.

IN THE DRAWINGS

FIG. 1 is a fragmentary section view illustrated somewhat schematically taken through a half portion of a chucking and indexing device.

FIG. 2 is a partial plan view of the chucking and indexing head of FIG. 1.

FIG. 3 is a fragmentary sectional view of a modified form of chucking collet.

FIG. 4 illustrates a fragmentary portion of a slightly modified form of the invention.

Figure 5:
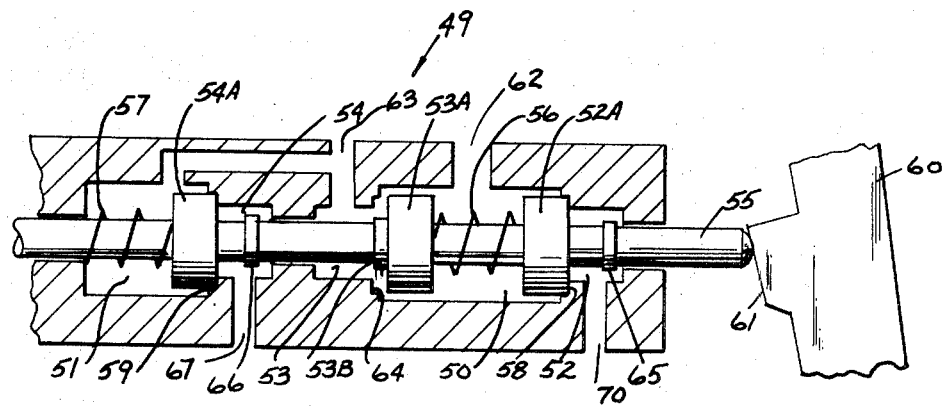
FIGS. 5, 6 and 7 illustrate a detailed section view taken through the control valve of the chucking and indexing mechanism wherein the valve is illustrated in various operating positions to illustrate the collet clamping, unclamping, and blow out positions respectively.

Referring to the drawing and more particularly to FIGS. 1 and 2, the chucking and indexing device 20 comprises a housing 21 in which a hollow spindle 22 is rotatably journaled by means of suitable needle bearings. A collet sleeve 23 is suitably keyed to the spindle for rotating therewith, and the sleeve 23 is in bearing relationship with a pressure plate 24 movably disposed within a chamber 25 defined within the housing 21. In the illustrated form of the invention the pressure plate 24 is subjected to a fluid pressure of a gaseous or liquid medium to effect displacement thereof.

The sleeve 23 is mounted for limited reciprocable movement with the bore extending axially through the spindle 22. A collet 26 is disposed within the bore of sleeve 23 for securing a workpiece W in position therein. In the case of internal chucking, a chucking arbor 26A as shown in Fig. 3 may be disposed in the sleeve. A cap 27 suitably threaded to the spindle 22 limits the collet movement.

The lower end of the sleeve 23 rests on suitable bearings 28 disposed in bearing relationship to the pressure plate 24. The arrangement is such that the bearing plate 24 functions as a piston which then displaced under fluid pressure introduced into an expandable chamber 29 will exert an upward pressure on the sleeve 23 or to effect axial displacement thereof relative to said spindle 22 through the intermediary of a roller or needle bearing 28.

In the illustrated form of the invention chamber, plate 24 is disposed adjacent the surface portion of a diaphragm 30 which defines with a base plate 31 the expandable fluid pressure chamber 29. Accordingly, the chamber 29 is sealed by securing the peripheral marginal portion of the diaphragm 29 between a base plate 31 and the side walls of the housing 21. In an alternative construction the pressure chamber 29 can be sealed by modified diaphragm construction 30A which is illustrated in a dot-dash line of Fig. 1. It will be understood that the pressure plate 24 may be formed of any suitable material as, for example, either a metal plate, or a plastic plate, or the like. Alternately the sealing of chamber 29 may be effected by a sealing lip 32 formed as an integral part of a modified pressure plate 24A in a manner illustrated in Fig. 4. In this form of the invention the lip 32 of the pressure plate 24A is disposed in bearing relationship to the wall of the housing 21. However, it will be readily apparent to one skilled in the art that other accepted sealing means may be utilized to form a fluid tight chamber 29 essential to effecting the displacement of the pressure plate 24 in an axial direction.

As seen in Fig. 1 the spindle 22 is provided with a laterally extending flange 22A which is preferably designed as a control cam to actuate the operations such as, finishing of a clamped operating cycle, release, clamping, actuation of an indexing movement, release of a new working cycle through the medium of a push rod 33 arranged to engage a switch means 34 which in turn is operatively connected to the operating or control valves directing the fluid pressure to the collet or indexing means. The indexing mechanism comprises an indexing means 35 connected or associated to the spindle and has formed about the periphery thereof a plurality of indexing notches 36 uniformly spaced about the circumference thereof. Any number of notches 36 may be provided depending upon the particular amount of indexing required for a given operation. It has been experienced that a convenient number of notches may be 12 or 24. An indexing gear plate 37 is rotatably journaled about the spindle 22 for movement relative to the indexing plate 35. The indexing driving gear plate 37 has a segmental portion of its periphery formed with a plurality of gear teeth 37A. Mounted on the gear plate 37 is an indexing pawl 38 having a tip end with a ratchet face portion adapted to effect engagement with the notches 36 of the indexing plate 35 so as to couple the index plate 35 to the gear plate 37 to effect the drive thereof. In this manner the required indexing movement is transmitted smoothly and accurately from the driving gear plate 37 to the associated indexing plate 35. In this manner the required indexing movement is smoothly and accurately performed while the spindle is reliably locked against undesired rotation.

The gear sector of gear plate 37 is arranged to engage with the teeth of a driving rack 39' which is constructed as part of an indexing plunger or piston 39 disposed in a cylinder assembly 41. It will be noted that when the indexing plunger 39 is subjected to fluid pressure, as for example, either a liquid or gaseous medium, it will tend to move a rectilinear amount thereby causing the gear plate 37 to transmit the displaced angular movement thereof to the associated indexing plate 35 and connected spindle 22 thereby causing the latter to be rotated a predetermined angular amount to effect the indexing of the workpiece W therein. Preferably the head 39A of the indexing plunger 39 may be formed of a plastic and sealing may be obtained by one or more lips 39B or sealing rings operatively connected with the head end 39A of the plunger 39. It will be noted that the sealing lip 39B may be formed as an integral part of the plunger piston head 39A which thereby enables the same to be formed simultaneously as, for example, by injection molding or casting.

An adjustable stop 42 may be provided to limit the indexing rotation. Disposed within the piston chamber 41 to control the stroke of the driving plunger 39 is provided a means whereby the angular degree of indexing of the spindle 22 may be adjusted or controlled with very little effort thereby minimizing the loss of time and cost of labor otherwise required to effect the adjustment of the indexing movement. The indexing adjusting means includes a bushing or stop 43. By varying the length of the stops 43, the travel of the plunger and associated rack 39 can be controlled accordingly.

Figure 6:
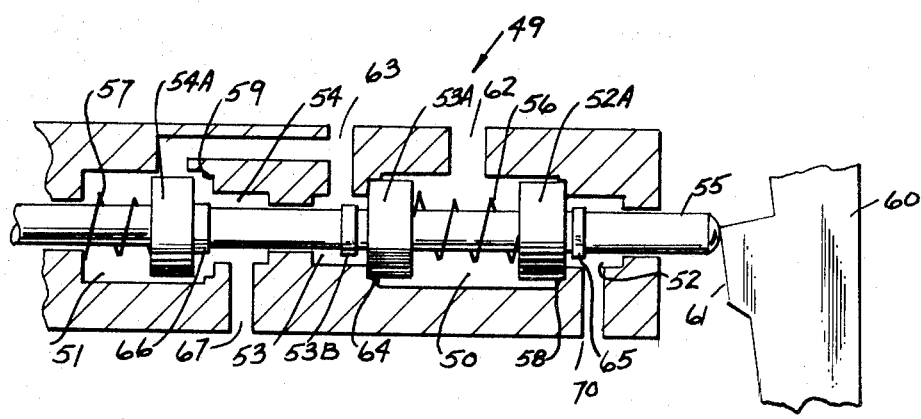
Figure 7:
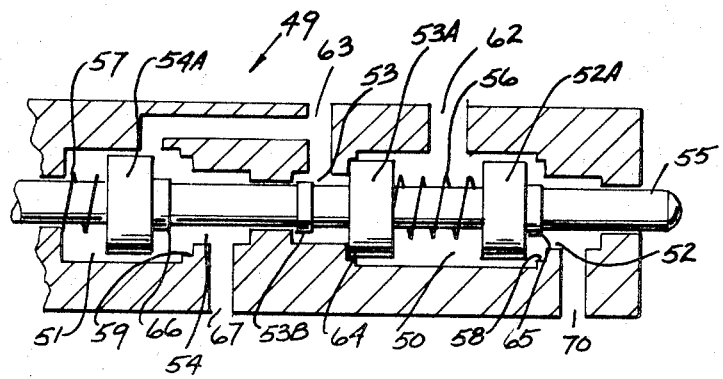

If desired, a differential drive 44 may be interposed between the indexing plate 35, which in this form is rotatively disposed relative to spindle 22 for effecting rotation of the spindle 22 through an angular indexing amount which need not correspond to the number of notches 36 circumferentially spaced about the edge of the indexing plate 35. As noted in FIGS. 1 and 2, the differential 44 includes a gear carried on the index plate and it is disposed in meshing relation with a gear track 35A on plate 35 and a gear sector 45 on spindle 22. FIGS. 5, 6, and 7 illustrate the control valve and actuator for effecting the clamping and unclamping of the workpiece within the chuck and which valve can be constructed and arranged for either manually or automatic operation. As shown in FIGS. 5 to 7, the valve body 49 disposed in housing 21 contains two chambers 50, 51 and axially aligned subchambers 52, 453, 54. The subchambers 52, 53, 54 are valved respectively by pistons 52A, 53A, 54A which are slidably mounted for relative movement on a piston rod 55. The respective pistons 52A, 53A, 54A are pushed by springs 56, 57 toward a fixed positioning or stop ring 53B on the rod or against the radially and axially arranged sealing faces or projections 58, 59 as seen in Fig. 5. It will be understood that the chambers and pistons respectively are sealed as, for example, by O-rings or the like which are not illustrated. Also, it may be desirable that the pistons 52A, 53A, 54A be formed of plastic material having an integrally formed sealing lip or projection formed integral therewith to effect the required sealing.

In the illustrated form of the invention the piston rod 55 is actuated by a hand lever 60 having an appropriate cam sector attached thereto. However, it will be readily understood that the rod 55 may be suitably actuated by other mechanical means, as for example, a solenoid or an auxiliary piston and cylinder assembly in the event remote control actuation of the valve means is desired. In the neutral position of the control valve 49 as shown in FIG. 5 the pressure medium, as for example, pneumatic pressure or hydraulic pressure, enters at inlet 62 and is unrestrictably directed through chamber 50 to subchamber 53 to exhaust 63 and then into chamber 29 of the chucking head. It will be noted that when chamber 29 is under fluid pressure, the pressure plate 24 is displaced axially toward the sleeve 23 to effect displacement actuation of collet 26 toward a clamping position. Accordingly, if a workpiece W is disposed within the collet 26 in the sleeve 23 when chamber 29 is under pressure, the collet will effect the clamping of the workpiece. When the piston rod is displaced to the left, as indicated in FIG. 6, the spacing of the respective pistons 52A, 53A, 54A relative to the sealing faces 58, 64, 59 and the arrangement of the positioning rings 64, 65 is such so as to initially close the exhaust port 63 to chamber 29 of the clamping cylinder. Simultaneously the air channel to port 67 opens whereby the pressure in chamber 29 is exhausted. When this occurs the pressure plate is lowered and the collet sleeve 23 is lowered to effect the opening of the collet 26. This exhaust air is also thus used for removing the swarf and/or contaminates from the clamping or chucking zone.

To remove the swarf and contaminates in the part of the spindle 22 or collet 26 with absolute reliability and also to eject the finished workpiece, the piston rod 55 is pushed further to the left as viewed in FIG. 7. In this position piston 52A is disposed by stop ring 65 to open channel 70 so that the pressure medium can reach the bore of the spindle 22 whereby the workpiece can be ejected. The duration of the cycle can be set to the required length by a hand lever with a control cam 26, or by solenoid arrangement, or an auxiliary piston and cylinder assembly. For fine adjustment a throttle valve of any suitable known type may be utilized in conjunction therewith.

To allow or facilitate the loading of a new workpiece, the exhaust pressure procedure is interrupted by the return movement of the piston rod until the air channel 70 is closed.

Figure 8:
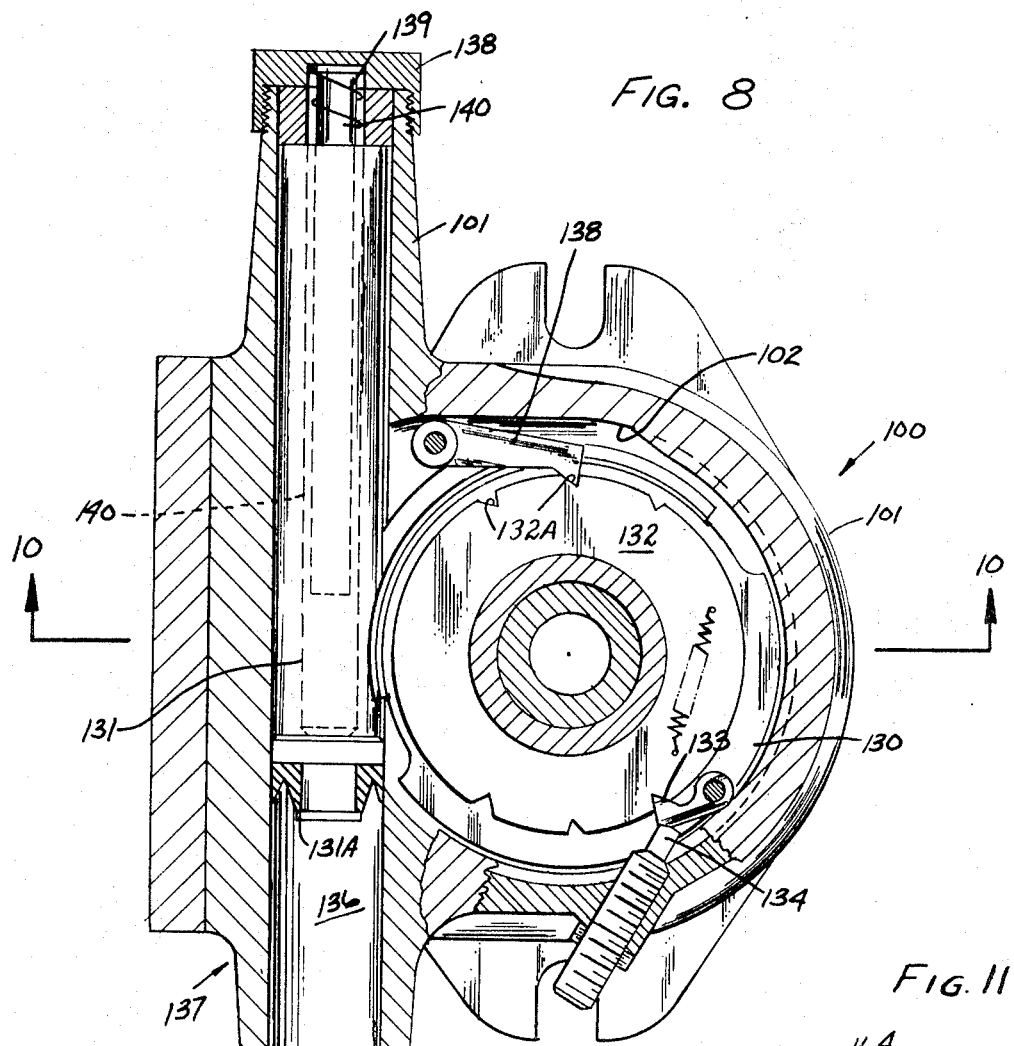
FIG. 8 illustrates a plan view of a modified form of the invention, partly in section taken along line 8–8 on FIG. 10.
Figure 9:
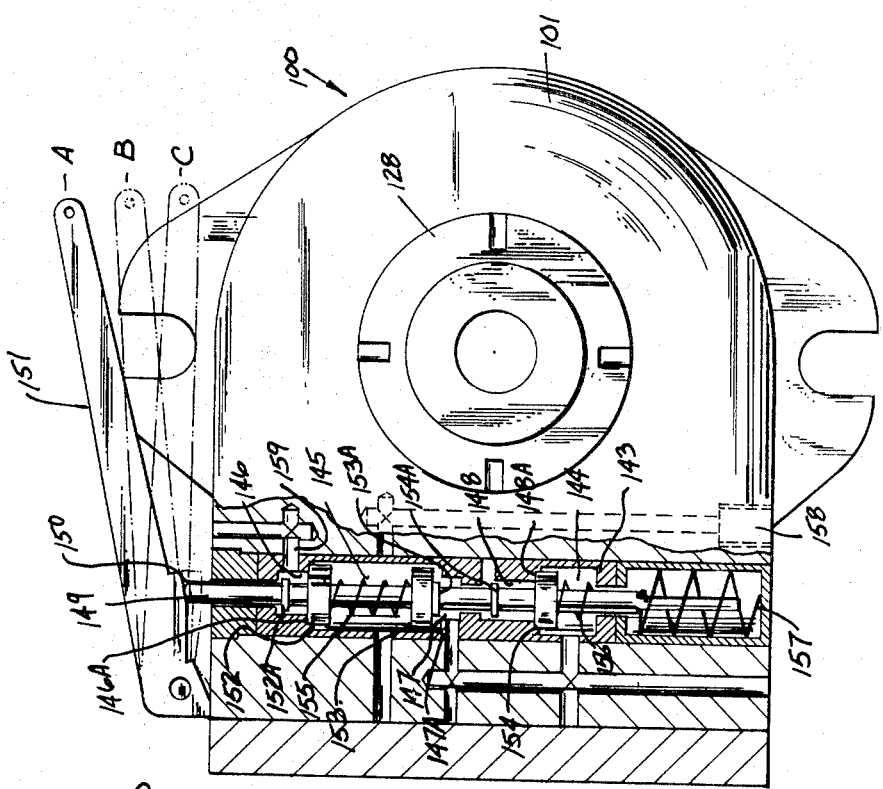
FIG. 9 is a plan view of the chucking and indexing head having parts thereof shown in section taken along line 9–9 on FIG. 10.
Figure 10:
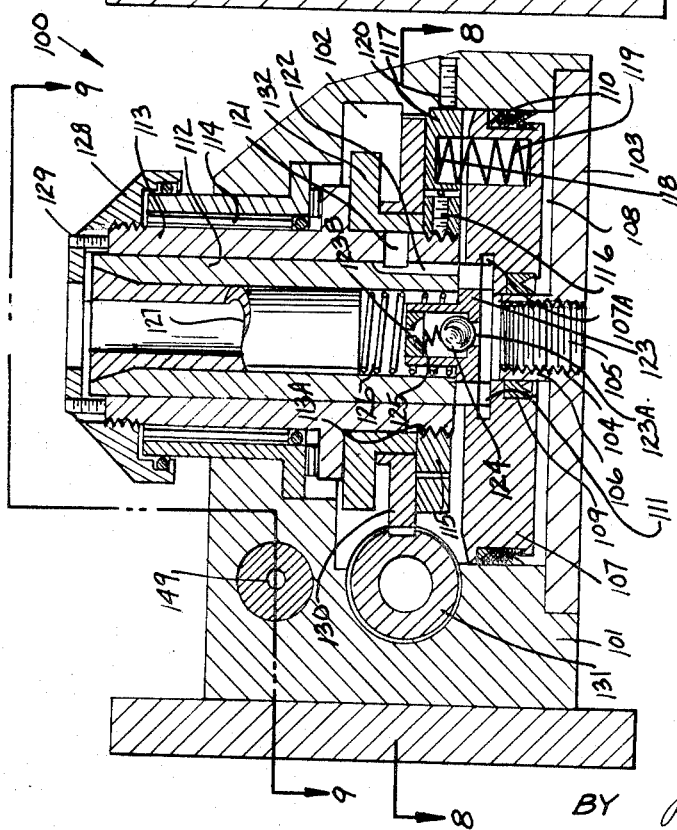
FIG. 10 is a sectional side view taken along line 10–10 on FIG. 8.

FIGS. 8 through 10 are directed to a modified form of the invention. In this form of the invention the chucking and indexing head 100 comprises a housing 101 having formed internally thereof a bore or chamber 102 for accommodating the moving component parts of the device as will be hereinafter described.

Referring to FIG. 10, the bottom of the housing 101 is closed by an end plate 103 which is suitably secured to the housing 101 by a plurality of circumferentially spaced fastening means (not shown). The end plate 103 is provided with a central opening 104 which may be suitably closed by a threaded end plug 105. The inner surface of the end plate 103 is provided with an integrally extended boss or collar 106 into which the end plug 105 is threaded. A pressure plate 107 is disposed for a limited axial movement within the chamber 102 of the housing 101 so as to define with the end plate 103 an expandable fluid pressure chamber 108. The pressure plate 107 is thus defined as an annular member having an inner sealing gasket 109 disposed in sealing relationship with the collar or boss 106 and an outer gasket 110 circumscribing the outer periphery thereof and disposed in sealing relationship with the end walls of the chamber 108.

The upper central portion of the pressure plate 107 is provided with a central recess 107A on which a needle bearing 111 is supported and which functions as a thrust bearing for a collet sleeve 112 as will be hereinafter described.

A hollow spindle 113 is rotatably supported in a suitable needle bearing 114 within the housing 101. As shown, the lower end of the spindle 113 is provided with a threaded portion 113A on which a nut 115 is threadably engaged and which may be secured in place by a set screw 116.

Referring to Fig. 10, the spring ring 117 is provided with a plurality of circumferentially extending spring seats 118 adapted to receive a spring 119 interposed between the pressure plate 107 and the spring ring 117. The plurality of springs 119 circumferentially spaced between the pressure plate 107 and the spring plate or ring 117 will normally exert a biasing force on the pressure plate 107 in a direction opposite a fluid pressure adapted to act thereon, as will be hereinafter described. A laterally extending set screw 120 secures the spring plate or ring 117 in position within the housing so as to prohibit relative rotation thereof.

Referring to FIG. 10, the spindle is provided with an internal key 121 which is adapted to engage a keyway 122 formed in the collet sleeve 112. Disposed in the lower end of the collet sleeve 122 is a valve body 123 in the form of an end plug suitably secured to the sleeve 112 by threads. The valve body 123 is provided with a fluid inlet 123A having a valve seat which is valved by a ball-type valve 124. The upper end of the valve body 123 has an outlet 123B in communication with the bore of sleeve 112. A spring means 125 is disposed in the valve body 123 for normally urging the ball valve 124 against the valve seat of the inlet 123A. Coil spring 126 surrounds the valve body and it is adapted to bear against a collet 127 adapted to be retained within the sleeve 112.

Secured to the upper end of the spindle 113 is a cap 128 which cooperates with sleeve 112 to retain a collet 127 in position. The cap 128 is threaded to the spindle and secured in place by set screws 129.

The collet sleeve 112 is arranged for relative reciprocal movement within the spindle 113, the arrangement being such that reciprocal movement of the collet sleeve 112 in the upward direction as viewed in FIG. 10 functions to effect the clamping of the workpiece within collet 127. The head described includes an indexing means to effect the indexing of the workpiece about a vertical axis. In this form of the invention the indexing means comprises an indexing gear plate 130 which is rotatably journaled about a lower portion of the spindle 113. A segmented portion of the peripheral edge of the indexing gear plate 130 is provided with a series of gear teeth which are adapted to be disposed in meshing relationship with a rack assembly 131, as will be hereinafter described. Secured to the spindle 113 is an indexing plate 132. As best seen in FIG. 8 the indexing plate 132 is provided with a plurality of circumscribing ratcheting notches 132A which are spaced about the peripheral edge portion thereof. It will be appreciated that any number of such notches 132A may be formed in the indexing plate 132 depending upon the angular degree of indexing desired on each indexing operation. Preferably 12 or 24 notches may be provided.

Coupling means are provided for interconnecting the index plate 132 in driving relationship to the indexing gear plate 130. In the illustrated form of the invention the coupling means comprising a pawl 133 is pivotally connected to the indexing gear plate 132 and having a head end portion which is adapted to be brought into engagement with the corresponding notch 132A of the indexing plate 132. Cooperatively associated with the driving pawl 133 is an adjustable stop 134 which is precisionally adjusted so as to limit the indexing movement. It will be understood that the adjustment of the stop 134 can be varied depending upon the angular degree of indexing required. With an indexing plate 132 provided with 12 notches it will be understood that the number of indexing movements can be any multiple of 12, that is, the workpiece may be indexed 3, 4, 6 and 12 times, as desired. A backup pawl 138 pivotally mounted on the housing prohibits antirotation of the index plate 132.

As will be hereinafter described a spacer 135 is disposed in the chamber of the piston rack assembly 137 so as to control the throw of the rack 131 which in turn controls the angular rotation of the indexing gear plate 130.

The rack 131 is rendered fluid actuated. Accordingly the rack 131 is operatively connected to a piston head 131A reciprocally mounted in a longitudinal extending chamber 136 formed integral with the housing 101 of the chucking and indexing device. As best seen in FIG. 8, one end of the chamber 136 is provided with a closure end plug 138 against which a coil spring 139 is backed for maintaining the piston rack 131 under spring tension. If desired the rack 131 may be guided along a guide rod 140 which is receivable in a bore 141 of the rack 131. The other end of the chamber 136 is closed by an end plug 141 constructed to define a fluid inlet 142 for directing a fluid pressure on the head end portion 131A of the piston rack 131. Accordingly, the piston head 131A is constructed to provide a fluid tight seal with the walls of chamber 136. To control the displacement or travel of the rack 131 an interchangeable spacer 135 is disposed in the chamber 136, and depending upon the angular degree of rotation or indexing desired for each indexing operation, the length of the spacer 135 can be varied. With an indexing plate 132 having 12 notches, the length of the spacer sleeve will proportion to provide for either 3, 4, or 6 indexing operations. Thus the greater the number of indexing operations required to be performed, the longer is the spacer sleeve required.

Referring to FIG. 9, a valving means is incorporated in the housing for directing fluid pressure to the chucking head to effect opening and closing of the collet 127 by fluid pressure and/or for ejecting the workpiece therefrom and cleaning the cutting therefrom. It will be understood that the valve means embodied in the arrangement of FIG. 8 through 10 is similar to that previously described with respect to FIG. 1. As shown, the valve means comprises a valve body 143 which is suitably disposed into a bore formed in the housing that extends transversely thereof.

The valve body is provided with a pair of valving chambers 144, 145 operatively connected to an associated subchamber 146, 147, 148. A valve stem 149 extends longitudinally with one end extending beyond the housing. The extended end of the stem 149 is disposed in bearing relationship to a cam portion 150 of an actuating lever 151. When the lever is moved to the positions A, B and C as indicated in FIG. 9, the valve stem is displaced accordingly.

Disposed on the valve stem are a plurality of valve heads 152, 153, 154 which are slidably mounted on the valve stem 149. A fixed collar or stop 152A, 153A, 154A is connected on the valve stem 149 so as to be operatively associated with the respective valve heads 152, 153, 154. Each valve head is arranged to valve a valve seat 146A, 147A, 148A of subchambers 146, 147, 148.

A coil spring 155 is interposed between heads 152 and 153 whereby in position A, the spring 1 55 urges valve head into sealing position against seat 146A and valve head 153 against stop 153A. Coil spring 156 bias valve head 154 against seat 148A. Spring 157 maintains a spring bias on stem 149.

In the A position as shown in FIG. 9 it will be noted that fluid pressure, e.g. air pressure entering through port 158 which is suitably connected to a source of pressure (not shown) is directed around valve head 153 to subchamber 157 from whence it is directed to chamber 108 to effect displacement of the pressure plate 107 and the clamping of the collet on the workpiece as previously described.

Upon shifting of the stem 149 as lever 151 is moved to position B, the air channel to chamber 108 is first closed by valve head 153 being bias toward valve seat 147A to seal same. Simultaneously stop 154A fixed on stem 149 causes valve head 154 to be displaced so as to open the air channel to effect exhausting of the pressure in chamber 108. When this occurs the springs 119 acting on pressure plate 107 causes the latter to be displaced, thereby moving the collet to a release position.

To remove the chip and eject the workpiece, the lever 151 is moved to position C wherein stop 152A causes valve head 152 to open chamber 152A and channel 159 to the valve body 123 in the spindle, and thereby directing pressure to the workpiece.

Indexing of the spindle 113 is attained by the displacement of the rack 131 operating on the gear plate 130 which in turn is coupled to the index plate 132 by a driving pawl 133. It will be noted that the notches 132A in plate 132 and the driving pawl are provided with inclined surfaces which will effect a driving connection in one direction and a ratcheting of the pawl 133 relative to plate 132 in the opposite direction so that the pawl 133 can be positioned in the next succeeding notch 132A. Holding pawl 138 insures against antirotation of the index plate 132. It will be understood that the fluid pressure for actuating the rack plunger is connected to an inlet 160 with suitable valves to control the pressure to chamber 136.

With the structure described the unit can be readily adapted to any degree of indexing by utilization of an appropriate index plate 132 and associated spacer 135 to control the travel of rack 131. Since these elements can be readily interchanged, the adaptation of the chuck head for a particular degree of indexing can be readily achieved.

Figure 11:
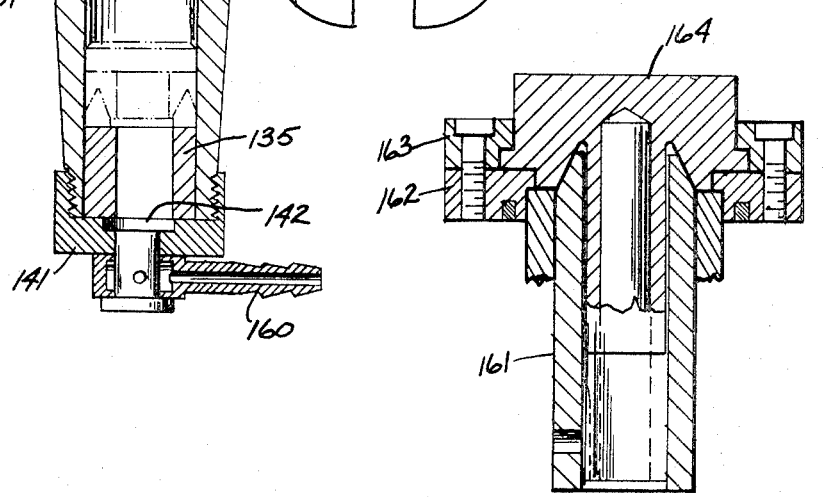
FIG. 11 is a detail of sleeve modified chuck construction.

FIG. 11 illustrates a means for internal chucking of a workpiece. Instead of a collet receiving sleeve 112, a special pressure sleeve 161 with associated nuts 162 and 163 is required. Also a special collet is required.

While the invention has been disclosed with respect to several embodiments thereof, wt will be appreciated and understood that variations and modifications may be made without departing from the spirit or scope of the invention.

What I claim is:

1. A fluid-actuated chucking and indexing head comprising:
   a housing,
   a hollow spindle rotatably journaled within said housing,
   chucking means for securing a work piece reciprocally mounted within said spindle,
   fluid-actuating means operatively associated with said chucking means for actuating said chucking means between operative and inoperative positions,
   a fluid-actuating indexing means operatively connected to said spindle to effect the indexing of said spindle predetermined angular amounts about its axis of rotation,
   said fluid-actuating means including an indexing plate connected to said spindle,
   an indexing gear plate mounted about said spindle in space relationship to said fluid-actuating means associated with said chucking means,
   a piston and cylinder actuating means for said indexing gear plate which includes a piston actuated rack means disposed in meshing relationship with said indexing gear plate for driving said gear plate predetermined angular amounts,
   a coupling means carried on said indexing gear plate operatively connecting said indexing plate in unidirectional driving relationship,
   means for adjusting the stroke of said rack,
   a control cam connected to said spindle, and
   a control means actuated by said control cam to control the sequencing of said chuck actuating means and said indexing actuating means.

2. The invention as defined in claim 1 wherein said fluid-actuated indexing means comprises;
   an indexing plate connected to said spindle,
   an indexing gear plate mounted about said spindle for relative rotation with respect thereto,
   piston-actuated rack means disposed in meshing relationship with said gear plate for driving said gear plate predetermined angular amounts, and
   coupling means operatively connecting said indexing plate in driving relationship with said gear plate.

3. The invention as defined in claim 2 wherein said chucking means comprises;
   a sleeve adapted to receive a collet, and
   a nose cap operatively associated therewith for confining a collet within said sleeve.

4. The invention as defined in claim 3 and including;
   a valve body disposed adjacent the bottom of said sleeve,
   said valve body having a port opening therein, and
   a means for valving said port opening.

5. The invention as defined in claim 3 and including;
   a spring means disposed within said sleeve for biasing a collet adapted to be received by said sleeve.

6. The invention as defined in claim 1 wherein said actuating means comprises;
   means defining a chamber formed in said housing, and
   a pressure plate being in bearing relationship with said chucking means, and
   means for directing a fluid pressure to said chamber to effect displacement of said pressure plate toward said chucking means for rendering said chucking means operative to secure a work piece adapted to be received thereby.

7. The invention as defined in claim 6 and including spring means operating on said pressure plate to normally bias said pressure plate against the force of the fluid pressure acting thereon.

8. The invention as defined in claim 6 and including means for sealing said chamber.

9. The invention as defined in claim 8 wherein;
   said means for sealing comprises a diaphragm, said diaphragm having its peripheral edge disposed in sealing relationship to a wall portion of said chamber.

10. The invention as defined in claim 6 wherein;
    said pressure plate includes a seal formed integral therewith,
    said seal circumscribing the peripheral edge of said pressure plate, and said seal being disposed in sealing relationship to the walls of said chamber.

11. The invention as defined in claim 2 wherein; said coupling means connect said indexing plate in unidirectional driving relationship to said gear plate.

12. The invention as defined in claim 11 wherein said coupling means include;
a plurality of notches circumferentially spaced about said indexing plate, and
a complementary pawl adapted to engage said notches mounted on said gear plate.

13. A fluid-actuated chucking and indexing head comprising:
a housing,
a hollow spindle rotatably journaled within said housing,
chucking means for securing a work piece reciprocally mounted within said spindle,
actuating means operatively associated with said chucking means for actuating said chucking means between operative and inoperative positions, and
indexing means operatively connected to said spindle to effect the indexing of said spindle predetermined angular amounts about its axis of rotation,
said indexing means including an indexing plate connected to said spindle,
an annular indexing gear plate mounted in circumscribing relationship about said spindle for relative rotation with respect thereto and spaced above said chuck-actuating means,
means for driving said gear plate predetermined angular amounts,
coupling means operatively connecting said indexing plate in driving relationship with said gear plate,
said driving means comprises a rack disposed in meshing relationship with said gear plate, and
means for effecting the displacement of said rack for imparting rotating indexing to said gear plate and indexing plate coupled thereto, and
control means operatively connected to said spindle for sequencing the operation of said chuck-actuating means and index drive means.

14. The invention as defined in Claim 13 wherein;
said latter means includes a piston and cylinder assembly, said piston being operatively connected to said rack.

15. The invention as defined in claim 14 and including means for adjusting the stroke of said piston and connected rack.

16. A fluid-actuating chucking and indexing head comprising:
a housing,
a hollow spindle rotatably journaled within said housing,
chucking means for securing a work piece reciprocally mounted within said spindle,
actuating means operatively associated with said chucking means for actuating said chucking means between operative and inoperative positions, and
indexing means operatively connected to said spindle to effect the indexing of said spindle predetermined angular amounts about its axis of rotation,
said indexing means including an indexing plate connected to said spindle,
an indexing gear plate mounted about said spindle for relative rotation with respect thereto,
means for driving said gear plate predetermined angular amounts,
means for driving said gear plate predetermined angular amounts,
coupling means operatively connecting said indexing plate in driving relationship with said gear plate,
said driving means comprising a rack disposed in meshing relationship with said gear plate,
means for effecting the displacement of said rack for imparting rotating indexing to said gear plate and indexing plate coupled thereto,
said latter means including a piston and cylinder assembly,
means for adjusting the stroke of said piston and connected rack, and
said adjusting means includes a spacer sleeve interposed in said cylinder between said piston and an end wall of said cylinder.

17. A fluid-actuated chucking and indexing head comprising;
a housing,
a hollow spindle rotatably journaled within said housing,
chucking means for securing a work piece reciprocally mounted within said spindle,
actuating means operatively associated with said chucking means for actuating said chucking means between operative and inoperative positions,
indexing means operatively connected to said spindle for effecting the indexing of said spindle predetermined angular amounts about its axis of rotation,
said indexing means comprising an indexing plate connected to said spindle,
an indexing gear plate mounted about said spindle for relative rotation with respect thereto,
means for driving said gear plate predetermined angular amounts,
coupling means operatively connecting said indexing plate in driving relationship with said gear plate,
said coupling means connecting said indexing plate in unidirectional driving relationship to said gear plate, and
including a differential drive means interconnected between the indexing plate and the spindle.

18. The invention as defined in claim 17 wherein said differential drive means includes a gear sector formed on said indexing plate,
a gear sector formed on said spindle, and
a differential gear disposed in meshing relationship with said gear sector and said indexing plate.

19. A fluid-actuated chucking and indexing head comprising;
a housing,
a hollow spindle rotatably journaled within said housing,
chucking means for securing a work reciprocally mounted within said spindle,
actuating means operatively associated with said chucking means for actuating said chucking means between operative and inoperative positions,
indexing means operatively connected to said spindle to effect the indexing of said spindle predetermined angular amounts about its axis of rotation.
said actuating means including means defining a chamber formed in said housing,
a pressure plate movably mounted within said chamber,
said pressure plate being in bearing relationship with said chucking means,
means for directing a fluid pressure to said chamber to effect displacement of said pressure plate toward said chucking means for rendering said chucking means operative to secure a work piece adapted to be received thereby,
said means for directing a fluid pressure to said chamber comprises a valve means including a plurality of valve chambers,
a rod movably mounted in valve chambers,
a plurality of pistons movably mounted on said rod,
said pistons subdividing said valve chambers into a plurality of sub valve chambers,
piston stops mounted on said rod,
spring means normally biasing said pistons toward said stops, and
an operator for effecting displacement of said rod and pistons movably mounted thereon for selectively positioning said movable pistons and associated valve.

20. A fluid-actuated chucking and indexing head comprising:
a housing,
a hollow spindle rotatably journaled in said housing, a chucking means including a sleeve mounted in said spindle for movement with and relative to said spindle, and a work-holding means operatively associated with said sleeve, said work holding means being operative to coupling and unclamping a workpiece within the sleeve, actuating means operatively associated with said chucking means for operating said work holding means between clamping and unclamping position, said actuating means including a chamber formed in said housing and a movable pressure plate disposed in said housing, and means for imparting a fluid pressure on said pressure plate to effect movement of said pressure plate toward and away from said sleeve, said latter means including a valve means for selectively controlling the flow of fluid pressure to said chamber and to said sleeve, control means operatively connected to said spindle for operating said chuck actuating means for indexing means.

21 A fluid-actuated chucking and indexing head comprising;

a housing having a chamber formed therein, a baseplate defining a closure for said chamber, a pressure plate movably mounted within said chamber, a spindle rotatably journaled in said housing, a sleeve keyed to said spindle to rotate in unison therewith, said sleeve being mounted for relative reciprocable movement relative to said spindle keyed thereto, said pressure plate being adapted to effect displacement of said sleeve relative to said spindle, means defining a work-holding means disposed within said sleeve cooperatively associated therewith to effect a clamping and unclamping of said workpiece within said sleeve upon the operation of said pressure plate, means for controlling the flow of fluid pressure to said chamber for effecting the displacement of said pressure plate within said chamber, and means for indexing said spindle and sleeve keyed thereto about the axis of rotation of said spindle, and including a valve disposed within said sleeve beneath the work-holding means adapted to be received in said sleeve, and said means for controlling the fluid pressure to said chamber including means to selectively direct fluid pressure to either said chamber or to said sleeve through said valve.

22. A fluid-actuated chucking and indexing head comprising;

a housing having a chamber formed therein, a baseplate defining a closure for said chamber, a pressure plate movably mounted within said chamber, a spindle rotatably journaled in said housing, a sleeve keyed to said spindle to rotate in unison therewith, said sleeve being mounted for relative reciprocable movement relative to said spindle keyed thereto, said pressure plate being adapted to effect displacement of said sleeve relative to said spindle, means defining a work holding means disposed within said sleeve cooperatively associated therewith to effect a clamping and unclamping of said work piece within said sleeve upon the operation of said pressure plate, means for controlling the flow of fluid pressure to said chamber for effecting the displacement of said pressure plate within said chamber, and means for indexing said spindle and sleeve keyed thereto about the axis of rotation of said spindle, and including a valve body connected to the end of said sleeve, a ball valve disposed in said valve body, and a spring means disposed in said sleeve.